(12) United States Patent
Lee et al.

(10) Patent No.: US 8,773,604 B2
(45) Date of Patent: Jul. 8, 2014

(54) HORIZONTAL ELECTRIC FIELD TYPE LIQUID CRYSTAL DISPLAY WHEREIN A PIXEL COMMON ELECTRODE IS CONTACTED WITH A COMMON ELECTRODE PATTERN IN A NON-DISPLAY PIXEL AREA WHERE A WIDTH OF A GATE LINE NARROWS

(75) Inventors: Sungkeun Lee, Kyungbuk (KR); Monsoo Kang, Daegu (KR); Jongsang Pyo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 460 days.

(21) Appl. No.: 12/591,840

(22) Filed: Dec. 2, 2009

(65) Prior Publication Data

US 2010/0141886 A1 Jun. 10, 2010

(30) Foreign Application Priority Data

Dec. 9, 2008 (KR) .................. 10-2008-0124655

(51) Int. Cl.
*G02F 1/136* (2006.01)
*G02F 1/1343* (2006.01)
(52) U.S. Cl.
USPC .............................. 349/48; 349/141; 349/139

(58) Field of Classification Search
CPC ................. G09G 3/3659; G02F 2001/134345; G02F 1/134336; G02F 1/13439
USPC ............................................ 349/48, 139, 141
See application file for complete search history.

(56) References Cited

U.S. PATENT DOCUMENTS

| 2006/0001815 A1* | 1/2006 | Kim et al. ..................... 349/141 |
| 2007/0002244 A1* | 1/2007 | Park et al. ..................... 349/141 |

* cited by examiner

*Primary Examiner* — Paul Lee
(74) *Attorney, Agent, or Firm* — McKenna Long & Aldridge LLP

(57) ABSTRACT

A horizontal electric field type liquid crystal display is disclosed. The horizontal electric field type liquid crystal display includes a gate line on a substrate, a data line crossing the gate line with a gate insulating layer interposed between the gate line and the data line, the gate line and the data line defining a pixel area, a thin film transistor (TFT) connected to the gate line and the data line, a pixel electrode that is connected to the TFT to receive a data signal, a common electrode pattern on which a common voltage is supplied, and a pixel common electrode that is electrically connected to the common electrode pattern to form a horizontal electric field together with the pixel electrode. The pixel common electrode contacts the common electrode pattern in a non-display area of an upper portion at one side of the pixel area.

7 Claims, 6 Drawing Sheets

HORIZONTAL ELECTRIC FIELD TYPE LIQUID CRYSTAL DISPLAY WHEREIN A PIXEL COMMON ELECTRODE IS CONTACTED WITH A COMMON ELECTRODE PATTERN IN A NON-DISPLAY PIXEL AREA WHERE A WIDTH OF A GATE LINE NARROWS

This application claims the benefit of Korea Patent Application No. 10-2008-124655 filed on Dec. 9, 2008, which is incorporated herein by reference for all purposes as if fully set forth herein.

BACKGROUND OF THE INVENTION

1. Field of the Invention

Embodiments of the invention relate to a liquid crystal display, and more particularly, to a horizontal electric field type liquid crystal display capable of improving a luminance and a contrast ratio.

2. Discussion of the Related Art

A liquid crystal display generally displays an image by controlling a light transmittance of liquid crystals using an electric field. The liquid crystal display may be roughly classified into a vertical electric field type liquid crystal display and a horizontal electric field type liquid crystal display depending on a direction of the electric field driving the liquid crystals. In the vertical electric field type liquid crystal display, a common electrode on an upper substrate and a pixel electrode on a lower substrate are positioned opposite each other, and liquid crystals of a twisted nematic(TN) mode are driven by a vertical electric field generated between the common electrode and the pixel electrode. The vertical electric field type liquid crystal display has an advantage of a large aperture ratio, but has a disadvantage of a narrow viewing angle. In the horizontal electric field type liquid crystal display, liquid crystals of an in-plane switching (IPS) mode are driven by a horizontal electric field generated between a common electrode and a pixel electrode that are positioned parallel to each other on a lower substrate. The horizontal electric field type liquid crystal display has an advantage of a wide viewing angle.

FIG. 1 is a plane view showing a pixel area of a related art horizontal electric field type liquid crystal display. FIG. 2 is a cross-sectional view taken along line I-I' of FIG. 1. FIG. 3 illustrates a simulation result of a transmittance of FIG. 1. In FIG. 3, a black portion indicates an area that prevents light from being transmitted, and a white area indicates an area that permits light to be transmitted.

As shown in FIG. 1, the related art horizontal electric field type liquid crystal display includes a thin film transistor (TFT) at a crossing of a data line DL and a gate line GL, a pixel electrode 10 connected to the TFT, a common electrode pattern 20 to which a common voltage is supplied, and a pixel common electrode 30 that is connected to the common electrode pattern 20 and is opposite to the pixel electrode 10. In the related art horizontal electric field type liquid crystal display, a pixel area P is divided into two domains, namely, a first domain D1 and a second domain D2, so as to widen a viewing angle.

The TFT includes a gate electrode connected to the gate line GL, a source electrode connected to the data line DL, and a drain electrode connected to the pixel electrode 10 through a first passivation hole PH1. The TFT is turned on, and thus a data voltage from the data line DL is supplied to the pixel electrode 10. The pixel electrode 10 includes a vertical portion 10a formed parallel to the data line DL at one side of the pixel area P and a slant portion 10b extending from the vertical portion 10a to form a predetermined slant angle with the gate line GL. The pixel common electrode 30 includes a vertical portion 30a formed parallel to the data line DL at the other side opposite the one side of the pixel area P and a slant portion 30b extending from the vertical portion 30a to form a predetermined slant angle with the gate line GL. The slant portion 10b of the pixel electrode 10 includes a plurality of finger portions having an up-down symmetric structure based on a domain boundary between the first domain D1 and the second domain D2, and the slant portion 30b of the pixel common electrode 30 includes a plurality of finger portions having an up-down symmetric structure based on the domain boundary. The finger portions of the slant portion 10b and the finger portions of the slant portion 30b are positioned parallel to and opposite one another on the same domain to be spaced apart from one another at a predetermined distance. The common electrode pattern 20 includes a first pattern 20a and a second pattern 20b. The first pattern 20a partially overlaps the pixel electrode 10 to form a storage capacitor Cst. The second pattern 20b partially overlaps the pixel common electrode 30 around the domain boundary and is electrically connected to the pixel common electrode 30 through a second passivation hole PH2. Liquid crystals positioned corresponding to the first domain D1 and the second domain D2 are oriented symmetric to each other based on the domain boundary and are driven by a voltage difference between the data voltage applied to the pixel electrode 10 and the common voltage applied to the pixel common electrode 30.

The related art horizontal electric field type liquid crystal display has the following problems.

First, because the second passivation hole PH2 is formed over a display area around the domain boundary, a critical width W1 of the pixel common electrode 30 formed around the domain boundary has to increase so as to secure an overlay margin between the second passivation hole PH2 and the pixel common electrode 30. As shown in FIG. 3, because light is prevented from being transmitted through the pixel electrode 10 and the pixel common electrode 30, an increase in the critical width W1 of the pixel common electrode 30 causes a reduction in a transmittance and a luminance.

Second, as shown in FIG. 2, the pixel common electrode 30 has a step portion along edges A and B of the second pattern 20b of the common electrode pattern 20 because of a thickness of the common electrode pattern 20 contacting the pixel common electrode 30 through the second passivation hole PH2. The liquid crystals positioned corresponding to the first domain D1 are out of alignment because of the step portion of the pixel common electrode 30. Hence, light leakage is caused. As a result, a black luminance increases, and an entire contrast ratio decreases.

Third, a distance between an uppermost slant portion 10b of the pixel electrode 10 and an uppermost slant portion 30b of the pixel common electrode 30 has to be equal to or greater than a critical distance L2, so as to prevent a short circuit. In a process for preventing the short circuit, an opening having a predetermined distance L1 is formed between the pixel electrode 10 and the pixel common electrode 30 that are opposite to a previous gate line. Because the predetermined distance L1 is determined depending on the critical distance L2, it is difficult to set the predetermined distance L1 to a value less than a distance L3 between the finger portions of each of the slant portions 10b and 30b.

As above, in the related art horizontal electric field type liquid crystal display, because the opening has the wide distance L1, an electric field is greatly generated between the pixel electrode 10 and the previous gate line, and between the pixel common electrode 30 and the previous gate line, and the liquid crystals are driven in an area affected by the electric field to generate the light leakage. Accordingly, in the related art horizontal electric field type liquid crystal display, the size of a black matrix pattern BM entirely covering the area affected by the electric field has to increase so as to prevent the light leakage. However, an increase in the size of the black matrix pattern BM reduces the entire luminance of the related art horizontal electric field type liquid crystal display.

SUMMARY OF THE INVENTION

Embodiments of the invention provide a horizontal electric field type liquid crystal display capable of improving a luminance and a contrast ratio.

In one aspect, there is a horizontal electric field type liquid crystal display comprising a gate line on a substrate, a data line crossing the gate line with a gate insulating layer interposed between the gate line and the data line, the gate line and the data line defining a pixel area, a thin film transistor (TFT) connected to the gate line and the data line, a pixel electrode that is connected to the TFT to receive a data signal, a common electrode pattern on which a common voltage is supplied, and a pixel common electrode that is electrically connected to the common electrode pattern to form a horizontal electric field together with the pixel electrode, the pixel common electrode contacting the common electrode pattern in a non-display area of an upper portion at one side of the pixel area.

The pixel common electrode contacts the common electrode pattern through a passivation hole passing through a passivation layer for protecting the TFT and the gate insulating layer.

The common electrode pattern includes a first pattern overlapping a portion of the pixel electrode and a second pattern exposed through the passivation hole, the first pattern and the second pattern being electrically connected to each other.

The pixel area is divided into two domains based on a horizontal line across the middle of the pixel area.

The pixel common electrode includes a first vertical portion formed parallel to the data line at a first side of the pixel area and a first slant portion extending from the first vertical portion to form a predetermined slant angle with the gate line. The first slant portion includes a plurality of finger portions having an up-down symmetric structure based on a domain boundary between the two domains.

The pixel electrode includes a second vertical portion formed parallel to the data line at a second side opposite the first side of the pixel area and a second slant portion extending from the second vertical portion to form a predetermined slant angle with the gate line. The second slant portion includes a plurality of finger portions having an up-down symmetric structure based on the domain boundary. The finger portions of the first slant portion and the finger portions of the second slant portion are positioned parallel to and opposite one another on the same domain to be spaced apart from one another at a first distance.

A second distance required to form an opening between an uppermost finger portion of the pixel electrode and an uppermost finger portion of the pixel common electrode, where the uppermost finger portion of the pixel electrode and the uppermost finger portion of the pixel common electrode are opposite to a previous gate line receiving a scan signal earlier than the gate line, is less than the first distance.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 4:
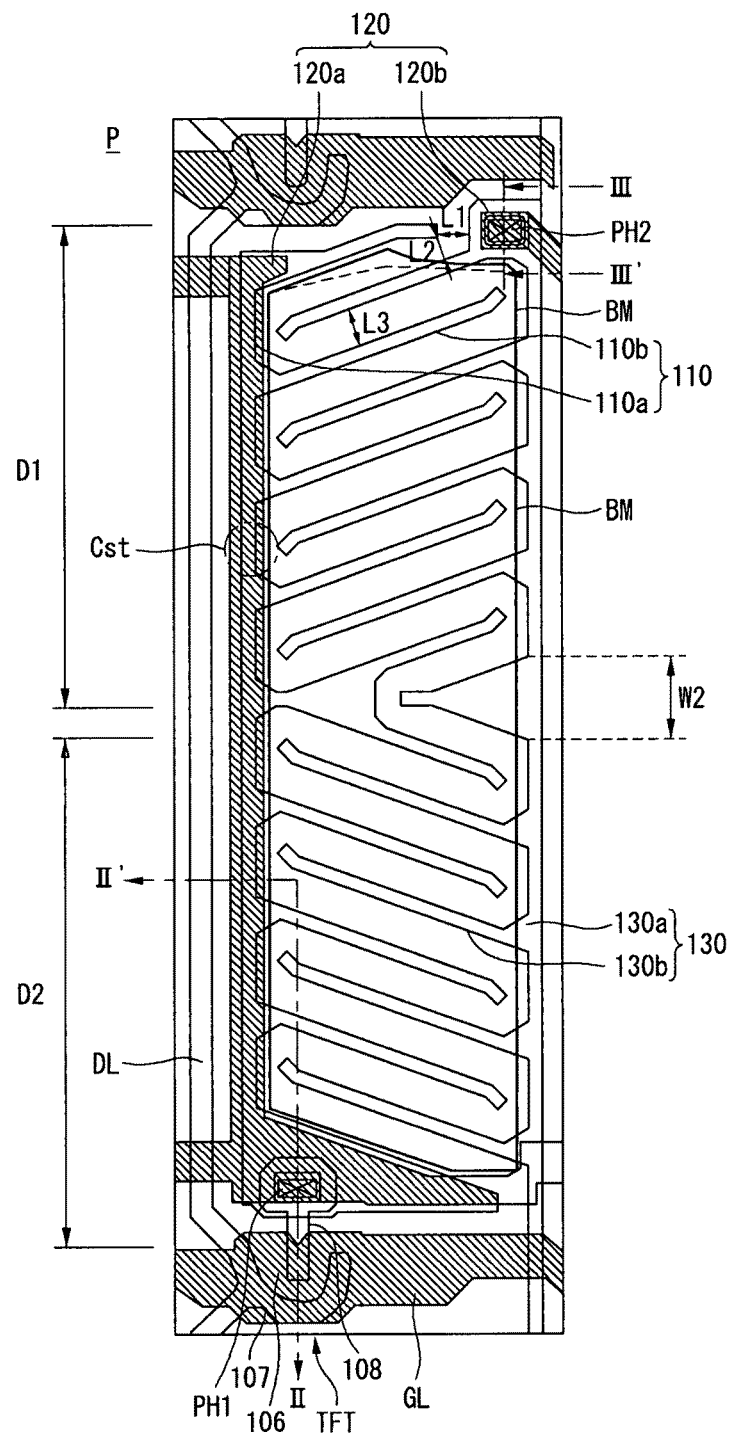
FIG. 4 is a plane view showing a pixel area of a horizontal electric field type liquid crystal display according to an embodiment of the invention.
Figure 5:
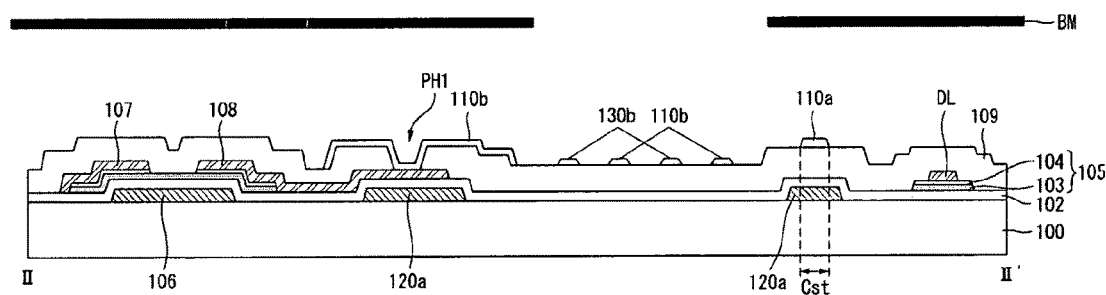
FIG. 5 is a cross-sectional view taken along line I-II' of FIG. 4.
Figure 6:
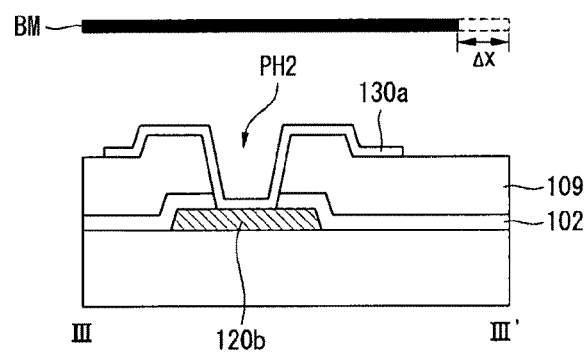
FIG. 6 is a cross-sectional view taken along line III-III' of FIG. 4.
Figure 7:
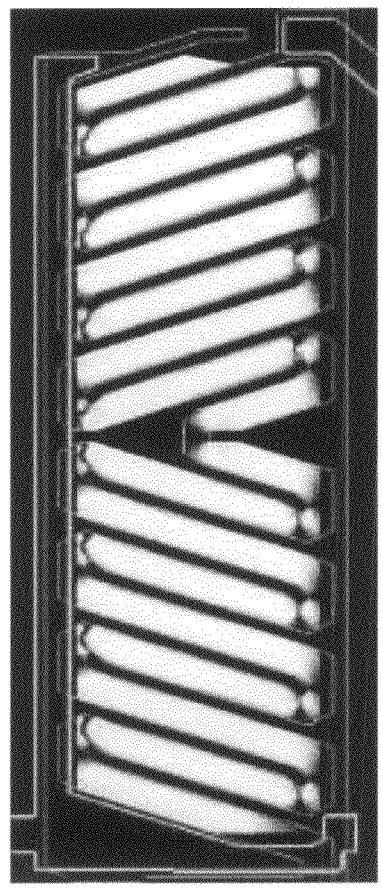
FIG. 7 illustrates a simulation result of a transmittance of FIG. 4.

FIG. 4 is a plane view showing a pixel area of a horizontal electric field type liquid crystal display according to an embodiment of the invention. FIG. 5 is a cross-sectional view taken along line II-II' of FIG. 4. FIG. 6 is a cross-sectional view taken along line II-III' of FIG. 4. FIG. 7 illustrates a simulation result of a transmittance of FIG. 4. In FIG. 7, a black portion indicates an area that prevents light from being transmitted, and a white area indicates an area that permits light to be transmitted.

As shown in FIGS. 4 to 7, a lower substrate 100 of a horizontal electric field type liquid crystal display according to an embodiment of the invention includes a gate line GL and a data line DL that cross each other with a gate insulating layer 102 interposed between the gate line GL and the data line DL, a thin film transistor (TFT) connected to a crossing of the gate line GL and the data line DL, a pixel electrode 110 that is formed in a pixel area P provided by a crossing structure of the gate line GL and the data line DL and is connected to the TFT, a pixel common electrode 130 that forms a horizontal electric field together with the pixel electrode 110 in the pixel area P, and a common electrode pattern 120 connected to the pixel common electrode 130. Although it is not shown, a gate pad connected to the gate line GL and a data pad connected to the data line DL are formed on the lower substrate 100. In addition, the horizontal electric field type liquid crystal display includes a black matrix, a color filter pattern, and an overcoat layer on an upper substrate.

In the horizontal electric field type liquid crystal display, the pixel area P is divided into two domains, namely, a first domain D1 and a second domain D2, so as to improve a viewing angle characteristic.

The gate line GL supplies a scan signal from a gate driver to the TFT, and the data line DL supplies a video signal from a data driver to the TFT. The gate line GL and the data line DL define the pixel area P. The gate line GL may be formed of Al, Mo, Cr, Cu, Al-alloy, Mo-alloy, or Cu-alloy and may have a single-layered structure or a multi-layered structure. Other materials and structures may be used for the gate line GL.

The TFT is turned on in response to the scan signal supplied to the gate line GL, and thus the pixel electrode 110 is charged to the video signal supplied to the data line DL and is kept at the video signal. For this, the TFT includes a gate electrode 106 included in the gate line GL, a source electrode 107 connected to the data line DL, a drain electrode 108 that is opposite to the source electrode 107 and is connected to the pixel electrode 110, an active layer 103 that overlaps the gate line GL with the gate insulating layer 102 interposed between the active layer 103 and the gate line GL to form a channel between the source electrode 107 and the drain electrode 108, and an ohmic contact layer 104 that is formed on the active layer 103 except the channel so as to ohmic contact the source electrode 107 and the drain electrode 108. A semiconductor layer 105 including the active layer 103 and the ohmic contact layer 104 overlaps the data line DL. The gate insulating layer 102 may be formed of an inorganic insulating material, such as silicon oxide (SiOx) and silicon nitride (SiNx). Other materials may be used. The source electrode 107 and the drain electrode 108 may be formed of Al, Mo, Cr, Cu, Al-alloy, Mo-alloy, or Cu-alloy and may have a single-layered structure or a multi-layered structure. Other materials and structures may be used for the source electrode 107 and the drain electrode 108. The semiconductor layer 105 may be formed of one of amorphous silicon and polysilicon.

The common electrode pattern 120 and the pixel common electrode 130 supply a reference voltage (i.e., a common voltage) for driving liquid crystals to each pixel. For this, the common electrode pattern 120 includes a first pattern 120a overlapping a portion of the pixel electrode 110 and a second pattern 120b connected to the pixel common electrode 130 in a non-display area of an upper portion at one side of the pixel area P. The second pattern 120b is electrically connected to the first pattern 120a. The common electrode pattern 120 may be formed of the same material as the gate line GL.

Figure 1:
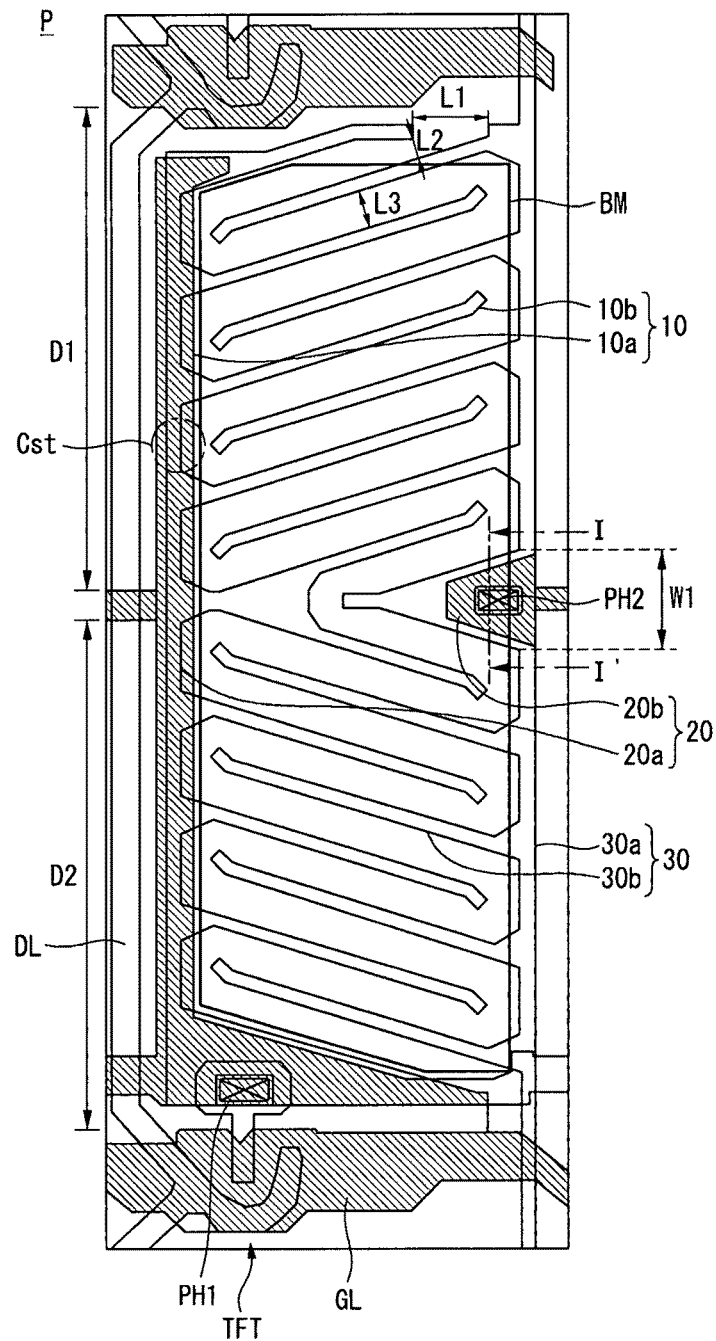
FIG. 1 is a plane view showing a pixel area of a related art horizontal electric field type liquid crystal display.
Figure 2:
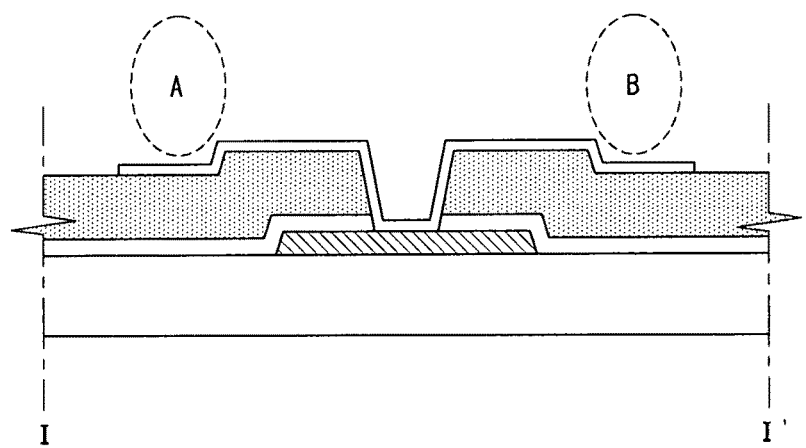
FIG. 2 is a cross-sectional view taken along line I-I' of FIG. 1.
Figure 3:
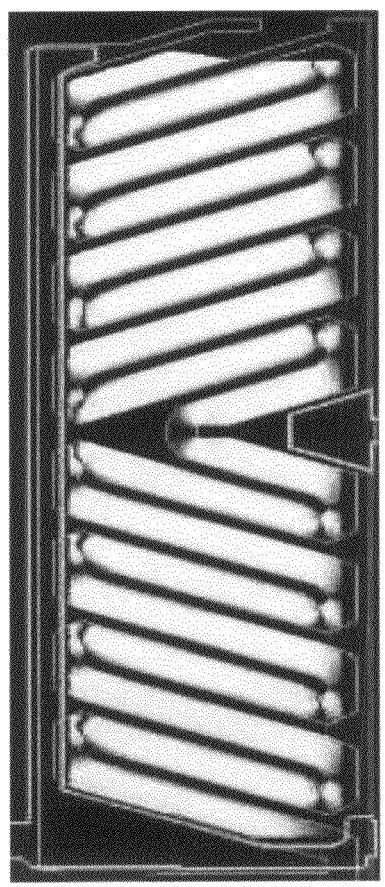
FIG. 3 illustrates a simulation result of a transmittance of FIG. 1.

The pixel common electrode 130 includes a vertical portion 130a formed parallel to the data line DL at a first side of the pixel area P and a slant portion 130b extending from the vertical portion 130a to form a predetermined slant angle with the gate line GL. The pixel common electrode 130 is formed in each pixel area P to receive the common voltage from the common electrode pattern 120. For this, the pixel common electrode 130 contacts the second pattern 120b of the common electrode pattern 120 through a second passivation hole PH2 passing through a passivation layer 109 and the gate insulating layer 102. The second passivation hole PH2 is formed in an overlapping portion between the vertical portion 130a of the pixel common electrode 130 and the second pattern 120b of the common electrode pattern 120 in the non-display area of the upper portion at the first side of the pixel area P. Hence, a critical width W2 of the pixel common electrode 130 is less than the related art critical width W1 (refer to FIG. 1), because an overlay margin between the second passivation hole PH2 and the pixel common electrode 130 does not need to be secured. Namely, because the critical width W2 of the pixel common electrode 130 decreases as compared with the relate art, a transmittance and a luminance increase as compared with the relate art. Further, because the second pattern 120b of the common electrode pattern 120 is formed in the non-display area of the upper portion at the first side of the pixel area P, a step portion is not formed in the pixel common electrode 130 around a domain boundary between the first domain D1 and the second domain D2. Hence, a light leakage is prevented, and an entire contrast ratio increases.

The vertical portion 130a of the pixel common electrode 130 is more widely formed than the related art vertical portion in the non-display area of the upper portion at the first side of the pixel area P, so as to secure the overlay margin between the second passivation hole PH2 and the pixel common electrode 130. Hence, although a distance between an uppermost slant portion 110b of the pixel electrode 110 and an uppermost slant portion 130b of the pixel common electrode 130 is kept at a critical distance L2 described in the related art, a distance L1 required to form an opening between the pixel electrode 110 and the pixel common electrode 130 that are opposite to a previous gate line is much less than the distance required to form the related art opening. In other words, the distance L1 required to form the opening is less than a distance L3 between finger portions of each of the slant portions 110b and 130b. As above, if the distance L3 between the finger portions decreases, the size of an area affected by an electric field of the previous gate line decreases.

Hence, the size of a black matrix pattern (BM) may be greatly reduced as compared with the related art. In FIG. 6, Δx indicates a reduction amount of the size of the BM. If the size of the BM decreases, an entire luminance increases. The slant portion 130b of the pixel common electrode 130 includes a plurality of finger portions having an up-down symmetric structure based on the domain boundary. The previous gate line indicates a gate line to which the scan signal is supplied earlier than the gate line GL. The pixel common electrode 130 may be formed of a transparent conductive layer, such as indium tin oxide (ITO), indium zinc oxide (IZO), tin oxide (TO), and indium tin zinc oxide (ITZO). Other materials may be used.

The pixel electrode 110 and the pixel common electrode 130 are positioned opposite each other in each pixel area P to generate a horizontal electric field. For this, the pixel electrode 110 contacts the drain electrode 108 exposed through a first passivation hole PH1. The pixel electrode 110 includes a vertical portion 110a formed parallel to the data line DL at a second side opposite the first side of the pixel area P and a slant portion 110b extending from the vertical portion 110a to form a predetermined slant angle with the gate line GL. The slant portion 110b of the pixel electrode 110 includes a plurality of finger portions having an up-down symmetric structure based on the domain boundary. The finger portions of the slant portion 110b and the finger portions of the slant portion 130b are positioned parallel to and opposite one another on the same domain to be spaced apart from one another at a predetermined distance. The pixel electrode 110 partially overlaps the common electrode pattern 120 to form a storage capacitor Cst. The storage capacitor Cst stably keeps the video signal supplied to the pixel electrode 110 constant during 1 frame. The pixel electrode 110 may be formed of the same transparent conductive layer as the pixel common electrode 130.

When the video signal is supplied to the pixel electrode 110 through the TFT, the pixel electrode 110 and the pixel common electrode 130 receiving the common voltage form a horizontal electric field to dielectric anisotropically rotate liquid crystal molecules arranged in a horizontal direction between the lower substrate 100 on which the TFT is formed and the upper substrate on which the color filter is formed. A transmittance of light transmitted by the pixel area P varies depending on a rotation level of the liquid crystal molecules, and thus a gray scale is achieved.

As described above, in the horizontal electric field type liquid crystal display according to the embodiment of the invention, because the passivation hole connecting the pixel common electrode to the common electrode pattern is formed in the non-display area of the upper portion at the one side of the pixel area, the critical width of the pixel common electrode around the domain boundary can decrease. Hence, the transmittance and the luminance can increase.

Furthermore, in the horizontal electric field type liquid crystal display according to the embodiment of the invention, because the common electrode pattern contacting the pixel common electrode through the passivation hole is formed in the non-display area of the upper portion at the one side of the pixel area, the need for forming the step portion in the pixel common electrode in the display area around the domain boundary is eliminated. Hence, the light leakage can be prevented, and the entire contrast ratio can increase.

Furthermore, in the horizontal electric field type liquid crystal display according to the embodiment of the invention, the size of the area affected by the electric field using the previous gate line can decrease by reducing the distance required to from the opening between the pixel electrode and the pixel common electrode opposite the previous gate line. Hence, the entire luminance can increase by reducing the size of the black matrix pattern capable of preventing the light leakage.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A horizontal electric field type liquid crystal display comprising:
   a gate line on a substrate;
   a data line crossing the gate line with a gate insulating layer interposed between the gate line and the data line, the gate line and the data line defining a pixel area;
   a thin film transistor (TFT) connected to the gate line and the data line;
   a pixel electrode that is connected to the TFT to receive a data signal;
   a common electrode pattern on which a common voltage is supplied; and
   a pixel common electrode that is electrically connected to the common electrode pattern to form a horizontal electric field together with the pixel electrode, the pixel common electrode contacting the common electrode pattern in a non-display area of an upper portion at one side of the pixel area, wherein the pixel common electrode contacting the common electrode pattern through a passivation hole is covered by a black matrix pattern,
   wherein a distance between the pixel electrode and the pixel common electrode contacting the common electrode pattern through the passivation hole that are opposite to a previous gate line is less than a distance between the previous gate line and the pixel common electrode contacting the common electrode pattern through the passivation hole,
   and
   wherein the pixel common electrode is contacted with the common electrode pattern through the passivation hole in the non-display area where a width of the gate line narrows.

2. The horizontal electric field type liquid crystal display of claim 1, wherein the pixel common electrode contacting the common electrode pattern through the passivation hole passes through a passivation layer for protecting the TFT and the gate insulating layer.

3. The horizontal electric field type liquid crystal display of claim 2, wherein the common electrode pattern includes a first pattern overlapping a portion of the pixel electrode and a second pattern exposed through the passivation hole, the first pattern and the second pattern being electrically connected to each other.

4. The horizontal electric field type liquid crystal display of claim 3, wherein the pixel area is divided into two domains based on a horizontal line across the middle of the pixel area.

5. The horizontal electric field type liquid crystal display of claim 4, wherein the pixel common electrode includes:
   a first vertical portion formed parallel to the data line at the one side of the pixel area; and
   a first slant portion extending from the first vertical portion to form a predetermined slant angle with the gate line, the first slant portion including a plurality of finger portions having some aspects of symmetry based on a domain boundary between the two domains.

6. The horizontal electric field type liquid crystal display of claim 5, wherein the pixel electrode includes:
   a second vertical portion formed parallel to the data line at the other side opposite the one side of the pixel area; and
   a second slant portion extending from the second vertical portion to form a predetermined slant angle with the gate line, the second slant portion including a plurality of finger portions having some aspects of symmetry based on the domain boundary,
   wherein the finger portions of the first slant portion and the finger portions of the second slant portion are positioned parallel to and opposite one another on the same domain to be spaced apart from one another at a first distance.

7. The horizontal electric field type liquid crystal display of claim 6, wherein a second distance required to form an opening between an uppermost finger portion of the pixel electrode and an uppermost finger portion of the pixel common electrode is less than the first distance.

* * * * *